United States Patent [19]

Takeda et al.

[11] Patent Number: 4,744,031

[45] Date of Patent: May 10, 1988

[54] METHOD OF AND APPARATUS FOR ALLEVIATING SHIFT SHOCKS OF AUTOMATIC TRANSMISSION

[75] Inventors: Hitoshi Takeda; Sadao Takase, both of Yokohama, Japan

[73] Assignee: Nissan Motor Co., Ltd., Yokohama, Japan

[21] Appl. No.: 698,377

[22] Filed: Feb. 25, 1985

[30] Foreign Application Priority Data

Feb. 23, 1984 [JP] Japan ................................. 59-31463

[51] Int. Cl.$^4$ ...................... B60K 41/08; G06F 15/20; G05D 17/02
[52] U.S. Cl. .................................... 364/424.1; 74/866
[58] Field of Search ............... 369/424.1; 74/858, 866; 192/0.052, 0.076, 0.092, 3.31

[56] References Cited

U.S. PATENT DOCUMENTS

| | | | |
|---|---|---|---|
| 4,222,292 | 9/1980 | Will et al. | 74/866 |
| 4,226,141 | 10/1980 | Espenschied | 74/858 |
| 4,266,447 | 5/1981 | Heess et al. | 74/866 X |
| 4,370,903 | 2/1983 | Stroh et al. | 74/858 |
| 4,370,904 | 2/1983 | Mueller et al. | 74/858 |
| 4,403,527 | 9/1983 | Mohl et al. | 74/866 X |
| 4,431,095 | 2/1984 | Suga | 192/3.31 |
| 4,457,410 | 7/1984 | Suga et al. | 192/0.052 |
| 4,463,842 | 8/1984 | Redzinski | 192/0.052 |
| 4,493,228 | 1/1985 | Vukovich et al. | 74/858 |
| 4,520,694 | 6/1985 | Eschrich et al. | 74/858 |
| 4,539,869 | 9/1985 | Suga et al. | 74/866 |
| 4,582,182 | 4/1986 | Takeda et al. | 192/3.31 |

Primary Examiner—Felix D. Gruber
Attorney, Agent, or Firm—Foley & Lardner, Schwartz, Jeffery, Schwaab, Mack, Blumenthal & Evans

[57] ABSTRACT

A method of and an apparatus for alleviating shocks occurring during a gear shift of an automatic transmission are disclosed. In order to alleviate shift shocks, the output torque of the engine is reduced upon the lapse of a delay time from the occurrence of a shift command and before the interruption of lock-up action of the torque converter. This delay time is updated using a factor determined by substracting a predetermined constant from a length of time from the occurrence of the shift command to an instant when an actual engine revolution speed agrees with a value of an estimated engine revolution speed variation during the interruption of lock-up action. The engine revolution variation is estimated based on an actual engine revolution speed variation trend taking place immediately after the occurrence of the shift command but before the interruption of lock-up action. The delay time updated in this manner is used during a gear shifting operation initiated by a subsequent shift command.

12 Claims, 8 Drawing Sheets

METHOD OF AND APPARATUS FOR ALLEVIATING SHIFT SHOCKS OF AUTOMATIC TRANSMISSION

CROSS-REFERENCES TO RELATED APPLICATIONS

The related applications are as follows:

(1) U.S. patent application Ser. No. 678,889, filed by Akio HOSAKA on Dec. 6, 1984;

(2) U.S. patent application Ser. No. 678,885, filed by Akio HOSAKA et al. on Dec. 6, 1984 (now U.S. Pat. No. 4,763,428);

(3) U.S. patent application Ser. No. 680,786, filed by Akio HOSAKA et al. on Dec. 12, 1984 (now U.S. Pat. No. 4,615,410);

(4) U.S. patent application Ser. No. 680,881, filed by Akio HOSAKA on Dec. 12, 1984 (now U.S. Pat. No. 4,682,667);

(5) U.S. patent application Ser. No. 680,785, filed by Akio HOSAKA on Dec. 12, 1984;

(6) U.S. patent application Ser. No. 678,886, filed by Akio HOSAKA on Dec. 6, 1984;

(7) U.S. patent application Ser. No. 694,409, filed by Akio HOSAKA on Jan. 24, 1985; and (8) U.S. patent application Ser. No. 683,354, filed by Hitoshi TAKEDA on Dec. 19, 1984 (now U.S. Pat. No. 4,691,285).

BACKGROUND OF THE INVENTION

The present invention relates to a method of and an apparatus for alleviating shift shocks occurring when an automatic transmission shifts between different transmission ratios.

Automatic transmissions are now widely used in automotive vehicles as a drive for driving an automotive vehicle. When the automatic transmission shifts from one ratio to another, an engine revolution rapidly changes due to a change in gear ratio, thus producing shift shocks mainly due to the inertia of the engine.

The automatic transmissions usually include a torque converter in an engine power delivery path thereof in order to multiply torque from an engine and absorb torque variations. The provision of the torque converter in the engine power delivery path causes a poor power transmission efficiency because of a slip in the torque converter. In order to alleviate this drawback, there has been proposed a torque converter with a so-called lock-up clutch which is is engaged to cause the lock-up action of the torque converter when the torque multiplication and torque variation absorbing functions are not needed. If a shifting operation is made with the torque converter in the lock-up state thereof, substantially great shocks take place because the torque variations upon shifting are not absorbed.

In the automatic transmission with such a lock-up torque converter, attempts to solve the above mentioned problem have been made by releasing the lock-up clutch to interrupt the lock-up action upon shifting.

Figure 7:
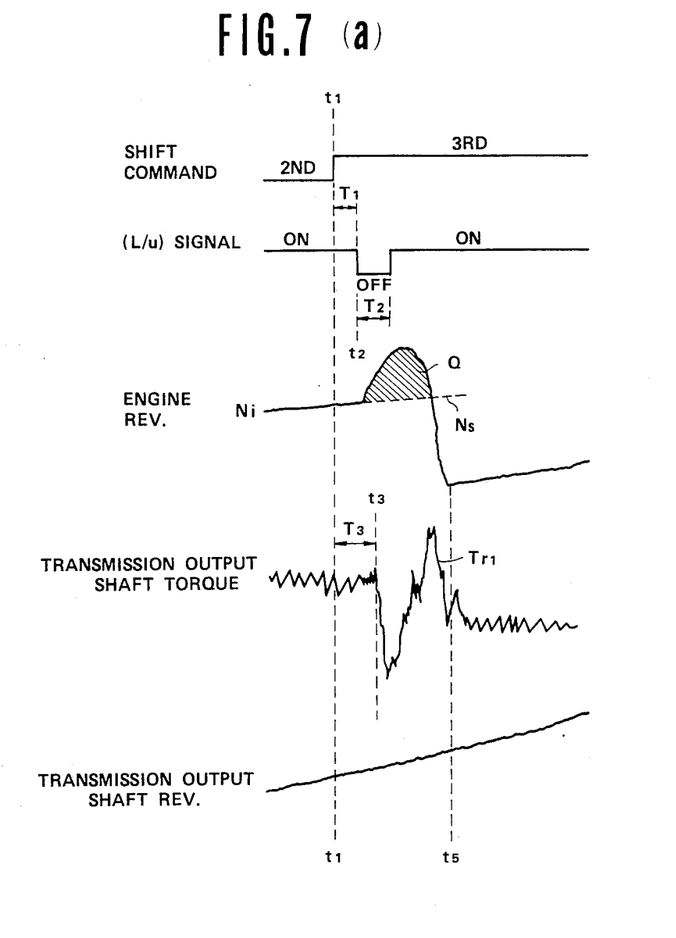
FIGS. 7(a) and 7(b) are time charts illustrating 2-3 shift operation before discussed.
Figure 7B:
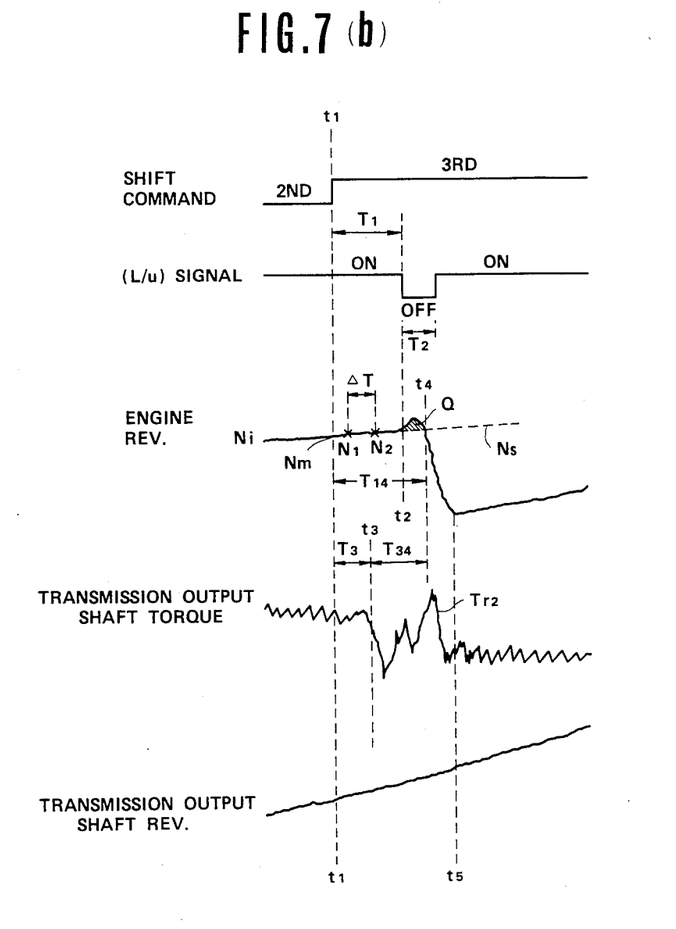

Description is made regarding this in detail taking as an example a 2-3 shifting operation illustrated in FIGS. 7(a) and 7(b), which 2-3 shifting operation may be carried out by a known lock-up type automatic transmission disclosed in U.S. Pat. No. 4,431,095 issued to Masaaki SUGA on Feb. 14, 1984. According to this control strategy, upon lapse of a delay time $T_1$ after an instant $t_1$ when a shift command for 2-3 shift is made, the interruption of the lock-up action of the torque converter begins by turning OFF the lock-up signal at an instant $t_2$ and then continues for a predetermined time $T_2$.

However, an actual delay time from the instant $t_1$ when the shift command is made to an instant $t_3$ when the actual shifting operation begins varies from one manufacturing product to another, and thus the delay time $T_1$ does not necessarily satisfy the optimal relationship with the actual delay, with the result substantial shocks cannot be alleviated to a sufficiently low level.

When the instant $t_2$ is not timed well with the instant $t_3$, the interruption of the lock-up action does not attain desired shock absorbing effect. That is, when the delay time $T_1$ is too short and thus the instant $t_2$ is advanced too much as compared to the instant $t_3$ as illustrated in FIG. 7(a), the engine races to allow a rapid increase in engine revolution as against the variation in a transmission output shaft revolution (vehicle speed) which is moderate due to comparably great inertia of the vehicle body even after the instant $t_3$. This causes the transmission output torque to vary with a substantially great peak $T_{r1}$ which appears immediately before an instant $t_5$ when the actual shifting operation is completed. This peak causes the generation of substantially great shift shocks. On the contrary, when the instant $t_2$ is delayed too much as compared to the instant $t_3$, substantially great shocks are also produced because the interruption of the lock-up action is not yet initiated as the instant $t_3$ when the actual shifting operation begins.

When the instant $t_2$ is timed well with the instant $t_3$ as illustrated in FIG. 7(b), the torque variation absorption function by the torque converter is fully utilized and the generation of the shift shocks can be alleviated to some degree. But there is the limit for the torque converter to absorb shift shocks, thus allowing a peak $T_{r2}$ to take place which causes shift shocks.

A known attempt to reduce the shift shocks due to the peak $T_{r2}$ is disclosed in U.S. Pat. No. 4,403,527. According to this known technique, the output torque of the engine is varied, such as by controlling at least one of the ignition timing, fuel supply and throttle opening degree, for a short period of time during the shifting operation with an intention to sufficiently alleviate shift shocks.

SUMMARY OF THE INVENTION

The present invention seeks to provide a method of and an apparatus for alleviating shift shocks wherein a delay time is accurately adjusted to an actual delay from an instant when a command for shifting is made to an instant when an actual shifting operation begins and the above mentioned engine output torque control begins upon lapse of the delay time determined as above.

According to the present invention, a command for shifting occurring in an automatic transmission is detected, a delay from an instant when the command for shifting is made to an instant when the actual shifting operation begins is determined by arithmetic operations and varying an engine output torque upon lapse of the delay determined, thereby to alleviate shift shocks.

DETAILED DESCRIPTION OF THE INVENTION

Hereinafter, the present invention is described in detail based on an illustrated embodiment.

Figure 1:
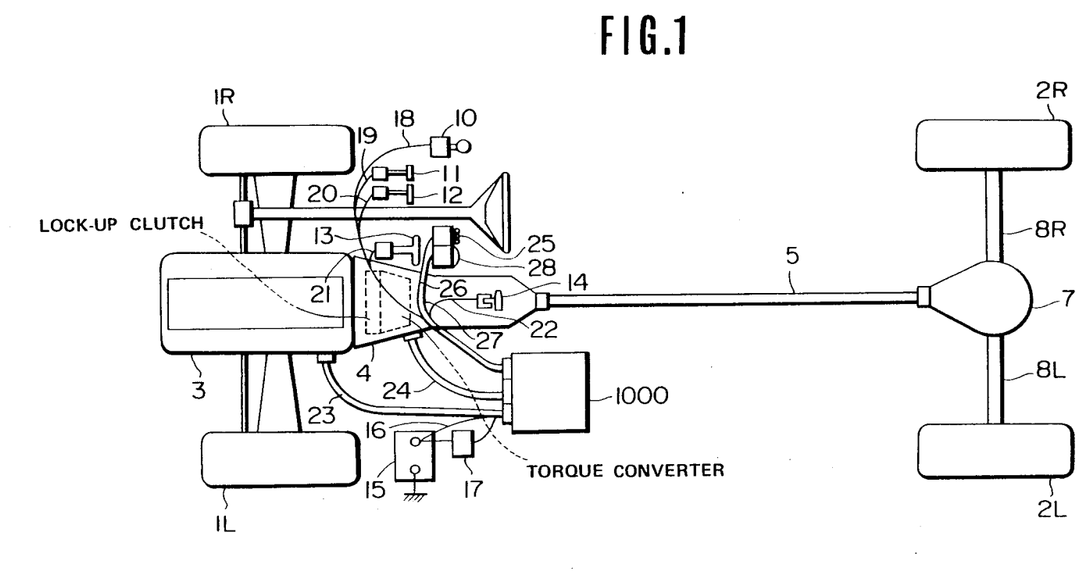
FIG. 1 is a plan view of an automotive vehicle illustrating an apparatus for alleviating shift shocks of an automatic transmission.

Referring to FIG. 1, there is shown a power train control system including a shift shock alleviating apparatus according to the present invention together with a power train of an automotive vehicle which is to be controlled. In the FIGS., 1L, 1R designate left and right front wheels, respectively, 2L, 2R designate left and right rear wheels, 3 designates an engine, 4 designates a automatic transmission having a torque converter with a lock-up clutch, 5 designates a propeller shaft, 7 designates a differential gear, 8L, 8R designates left and right rear axles. The front wheels 1L, 1R designate change direction wheels which are controlled by a steering wheel 9 to change direction of the automotive vehicle. The rear wheels 2L, 2R are driving wheels of the automotive vehicle which receive the output of the engine 3 that is delivered via the transmission 4, propeller shaft 5, differential gear 7 and axles 8L, 8R.

The start, operation and stop of the engine 3 is controlled by an ignition switch 10. The engine 3 can increase its output as the accelerator pedal 11 is depressed. The output of the engine 3 is delivered in the above mentioned delivery path the rear wheels 2L, 2R, enabling the vehicle to run. The vehicle can be stopped by depressing a brake pedal 12 and parked by manipulating a parking brake 13.

The transmission 4, which is to be controlled by the apparatus according to the present invention and forms together with the engine 3 a power train of an automotive vehicle, is rendered to establish a selected power delivery path in response to a manipulated position assumed by a select lever 14, such as a parking (P) range, a reverse (R) range, a neutral (N) range, a forward automatic drive (D) range, a manual second (II) brake range or a manual first (I) brake range and delivers the power from the engine 3 to the propeller shaft 5 with a selected gear position in a selected one of the drive ranges R, D, II and I.

The power train control system, including the shift shock alleviating apparatus according to the present invention, comprises a control unit 1000 which is common to the engine 3 and the transmission 4. This control unit is always supplied via an electric path 16 with an electric power which serves as a direct continuously connected electric power source from a vehicle battery 15 and it operates on an electric power from the vehicle battery 15 which is supplied thereto as a main power source via a power source relay 17 that is closed when the ignition switch 10 is turned ON. Although they are described later, those signal are fed to the control unit 1000 which are a signal from the ignition switch 10 via an electric path 18, a signal from the accelerator pedal 11 via an electric path 19, a signal from the brake pedal 12 via an electric path 20, a signal from the parking brake lever 13 via an electric path 21, a signal from the select lever 14 via an electric path 22, signals indicative of a crank angle of the engine 3, a crankshaft torque, an intake air flow rate and a temperature via a wire harness 23, and signals indicative of an output shaft revolution speed of the transmission 4 and an output shaft torque thereof via a wire harness 24. Based on these input signals arithmetic operations are performed and the results are fed via the wire harnesses 23, 24 to the engine 3 and the transmission 4, respectively, thereby to control them. The control unit 1000 is also supplied via an electric path 26 with data input signals from a data input device 25 manually operable by a driver, alters its operation mode depending on these data input signals and feeds various kinds of data via an electric path 27 to a display 28 where the data are displayed.

Figure 2:
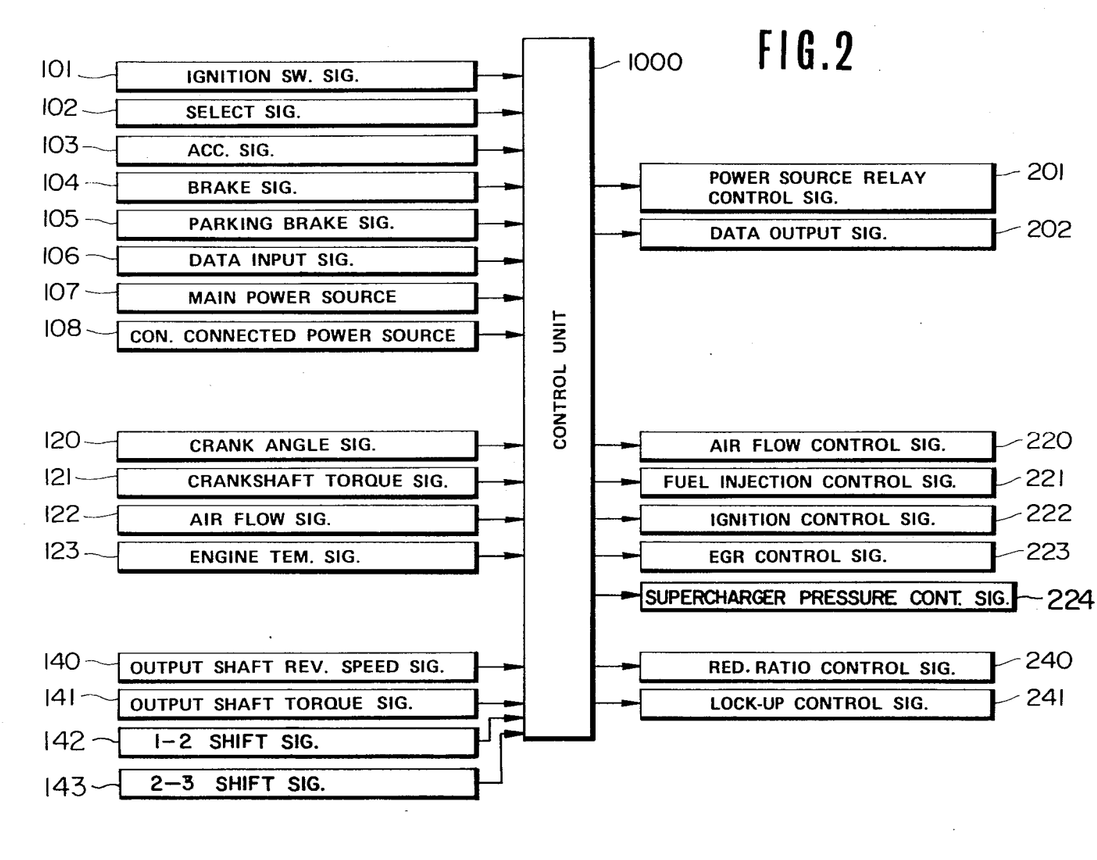
FIG. 2 is a block diagram illustrating a control unit with its various input and output signals.

Referring to FIG. 2, these input and output signals to and from the control unit 1000 are described in detail one after another. Among the input signals, an ignition switch signal 101 is indicative of which one of operation positions the ignition switch 10 assumes including a LOCK position, an OFF position, an ACCESSORY position, an ON position and a START position, and it is fed to the control unit 1000 via the electric path 18. Since the functions when the ignition switch 10 assumes these operation positions are well know, the description is omitted. A select signal 102 is indicative of which one of the before mentioned drive ranges P, R, N, D, II, I is selected via the electric path 28. An accelerator signal 103 which is a voltage signal variable in proportion to the depression degree of the accelerator pedal 11 is obtained by a potentiometer and fed to the control unit 1000 via the electric path 19. A brake signal 104 which is a voltage signal variable in proportion to the depression degree of the brake pedal 12 is obtained by a potentiometer and the like and fed to the control unit 1000 via the electric path 20. A parking brake signal 105 is obtained by a potentiometer and the like that is movable with the parking brake lever 13, which signal is a voltage signal variable in proportion to an operating position of the parking brake lever 13 and fed to the control unit 1000 via the electric path 21. Instead, the brake signal 104 and the parking brake signal 105 may be obtained by pressure sensors, each responsive to a bias force (a braking force) of a brake element. The signals 103, 104 and 105, although they were described previously as analog signals, may take the digital form by using encoders and the like.

A data input signal 106 is a signal from a key board of the data input device 25 or a switch and fed to the control unit 1000 via the electric path 26. The data input signal 106 specifies one of operation modes of the control unit 1000, for example a control operation mode and a self-checking mode or a power mode and a fuel economy mode. The main power source 107 is fed to the control unit 1000 via the power source relay 17 from the vehicle battery 15. The continuously connected power source 108 is always fed to the control unit 1000 via the electric path 16 from the battery 15.

A crank angle signal 120 is a pulse signal which is generated each time after the engine crankshaft has turned through a predetermined angular angle, which signal is fed to the control unit 1000 via the wire harness 23. This signal is generated by a photoelectric detector which detects a light passing through a slit plate, i.e., a disc rotatable with the crankshaft and formed with equiangularly distant slits. A crankshaft torque signal 121 is a voltage signal variable in proportion to the torque impressed on the crankshaft, the torque being detected using the piezoelectric effect. This signal is fed to the control unit 1000 via the wire harness 23. This signal 121 can be obtained by a torque sensor. The air flow signal 122 is a signal variable in inverse proportion to the intake air flow rate admitted to the engine, and it is fed to the control unit 1000 via the wire harness 32. This signal is obtained by an air flow meter usually used in a fuel injection type engine. An engine temperature signal 123 is a signal variable in proportion to a coolant temperature of the engine 3, which signal is fed to the control unit 1000 via the wire harness 23. This signal is obtained by a thermistor which is sensitive to the temperature of an engine coolant.

An output shaft revolution speed signal 140 is a signal variable in proportion to the revolution speed of the output shaft of the transmission 4, which signal is fed to the control unit 1000 via a wire harness 24. This signal can be obtained making a calculation based on a cycle or a frequency of a pulse signal that is generated by a similar means used to generate the crank angle signal 120. The output shaft torque signal 141 is a voltage signal which is proportional to the output shaft torque of the transmission 4, which signal is fed to the control unit 1000 via the wire harness 24. This signal can be generated by a torque sensor similar to one used to generate the crankshaft torque signal 121. A 1–2 shift signal 142 and a 2–3 shift signal 143 are signals indicative of positions of spools of a 1–2 shift valve and a 2–3 shift valve which are used in the automatic transmission 4 (a three forward speed transmission is used in this example) to determine a reduction ratio. These shift signals are given by 1–2 shift switch and a 2–3 shift switch which are operable responsive to the spool position and fed to the control unit 1000 via the wire harness 24. The 1–2 shift switch is closed for example when the 1–2 shift valve assumes a downshift position pausing the 1–2 shift signal to go to a L-level, and it opens when the 1–2 shift valve assumes an upshift position, causing the 1–2 shift signal 142 to go to a H-level. The 2–3 shift switch is closed for example when the 2–3 shift valve assumes a downshift position thereof, causing the 2–3 shift signal to go to a L-level, and it opens when the 2–3 shift valve assumes the upshift position, causing the 2–3 shift signal 143 to go to a H-level. Thus, the signals 142, 143 take L-level when a first reduction ratio is established because both of the 1–2 and 2–3 shift valves assume downshift position, the signal 142 goes to H-level when the second reduction ratio is selected from the first reduction ratio because the 1–2 shift valve is moved to the upshift position, and the signal 143 also goes to H-level when the third reduction ratio is selected from the second reduction ratio because the 2–3 shift valve is moved to the upshift position also. Therefore, the reduction ratio can be identified by a combination in levels of the signals 142 and 143, and it is also possible to identify a shifting in terms of the instant where the shifting takes place and in what kind of shifting it is by detecting how the signals change their level.

Hereinafter, output signals are described. The power source relay control signal 201 is provided to effect ON/OFF control of the power source relay 17 such that when the engine is in operation where the ignition switch 10 is placed to ON or START position, the power source relay 17 is turned ON, connecting the main power source relay 107 from the battery 15 via this power source relay 17 to the control unit 1000, and the power source relay 17 is kept closed even after the ignition switch 10 has been turned OFF until saving of the data is completed, keeping the connection of the main power source 107 to the control unit 1000. The data output signal 202 is delivered via the electric path 27 to the display 28, causing same to display a reduction ratio established in the transmission 4, a range selected by the select lever 14, and a result of diagnosis of the power train control system.

An air flow control signal 220 contains an instruction that is responsive to the accelerator signal 103 and is supplied via the wire harness 23 to the well known throttle actuator mounted to the engine 3, causing the throttle actuator to adjust the throttle opening degree to a level corresponding to the depression degree information (accelerator signal 103) of the accelerator pedal 11, thereby to adjust the air flow rate admitted to the engine 3 to a value corresponding to the air flow control signal 220. The air flow control signal 220 adjusts the throttle opening degree via the throttle actuator so as to keep the idle revolution constant. When the data input signal 106 instructs a constant speed crusing, the air flow control signal 220 adjusts via the throttle actuator the throttle opening degree as a result of comparision of a measured vehicle speed with an instructed vehicle speed value (a feedback control) in order to cause the vehicle to run at the instructed vehicle speed value. The fuel injection control signal 221 is a pulse signal which controls the opening time of a fuel injection valve mounted to the engine, which signal is delivered from the control unit 1000 via the wire harness 23. The above mentioned valve opening time duration (fuel injection amount), which is proportional to the intake air flow rate, is computed on the crank angle signal 120 and the air flow signal 122, and then this result is corrected in various manners, and the result is output in terms of the fuel injection control signal 221 in synchronous with the operation of the engine 3. The ignition control signal 222 is a signal which controls the ignition energy and the ignition timing by controlling in synchronous with the crank angle signal 120 the time during which current is allowed to pass through a primary coil of an ignition coil provided to the engine 3 and the termination timing of the current supply. This signal is delivered from the control unit 1000 via the wire harness 23. The ignition energy is controlled such that it is kept unchanged with a variation in the engine revolution speed (the cycle or the frequency of the crank signal 120) and a variation in the voltage of the battery 15, and the ignition timing is determined based on the engine revolution speed and crankshaft torque taking the output torque, fuel economy and exhaust gases into account. The EGR control signal 223 is a signal relating to the opening degree of an exhaust gas recirculation valve (exhaust gas recirculation rate), which signal is delivered from the control unit 1000 via the wire harness 23. The EGR valve opening as mentioned above is determined on the engine revolution speed and the crankshaft torque making the exhaust gas and fuel economy into account. A supercharge pressure control signal 224, which is generated via the wire harness 23, is used to control a supercharge pressure controller of a turbocharger so as to control a difference in pressure across a swing valve. With this signal, the swing valve controls fluid flow rate of exhaust gases passing through the turbocharger, thus regulating the supercharge pressure of intake air admitted to the engine.

A reduction ratio control signal 240 is a signal corresponding to a reduction ratio (gear position) established in the transmission 4 and delivered from the control unit 1000 via the wire harness 24. The reduction ratio is based on the input torque to the transmission (the engine crankshaft torque), i.e., the signal 121 or the signal accelerator signal 103, intake air flow signal 122) corresponding to this signal 121, and the vehicle speed (output shaft revolution speed signal 140) taking the driving torque, fuel economy, vibrations into account. The reduction ratio control signal 240 controls various kinds of shift solenoids of the transmission 4 in order to establish the desired gear position. The lock-up control signal 241 is a signal which controls connection and disconnection between the input and output elements of the torque converter in the transmission 4 and delivered from the control unit 1000 via the wire harness 24. The lock-up control signal 241 is determined on the crankshaft torque (signal 121) and the vehicle speed (signal 140) taking the fuel economy and vibrations into account, in order to control the above mentioned connection or if desired a relative rotation (slip) between the input and output elements of the torque converter.

Figure 3:
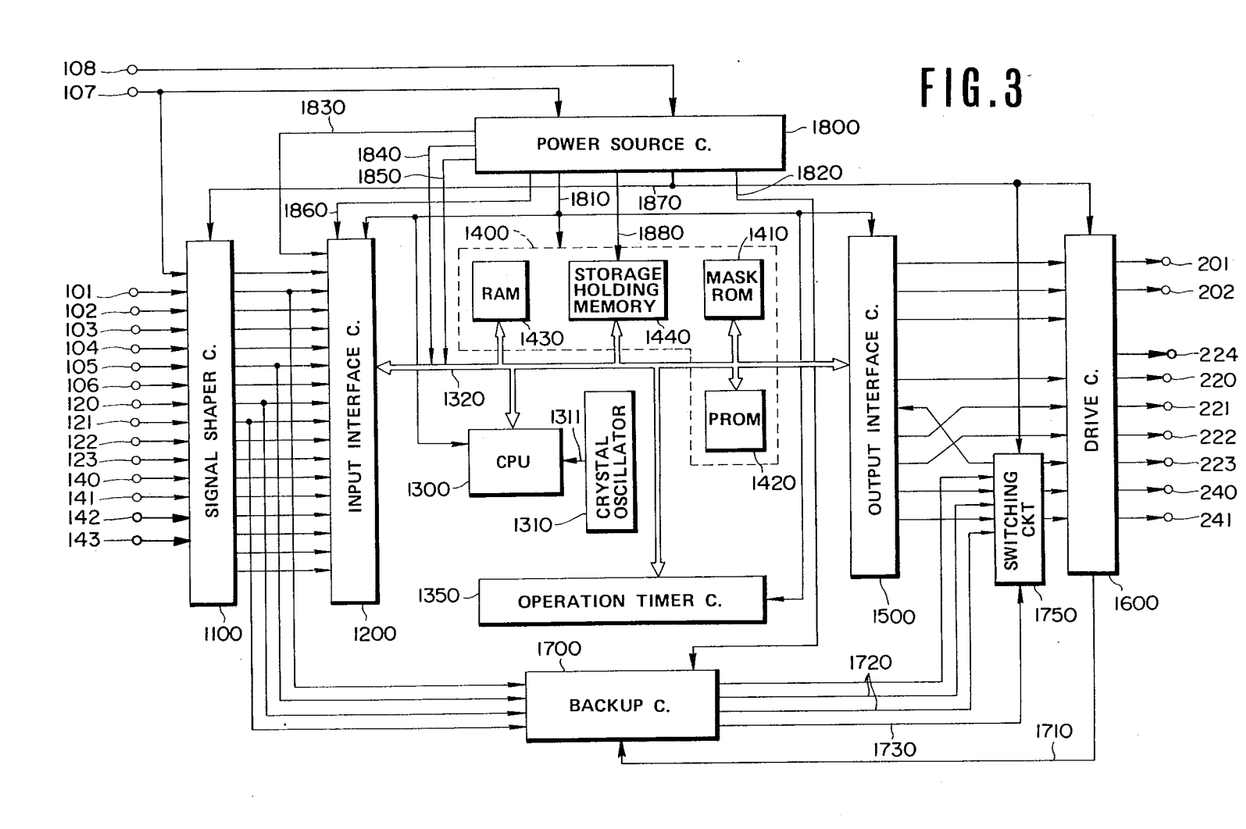
FIG. 3 is a detailed block diagram of the control unit.

Hereinafter, referring to FIG. 3, a practical example of the architecture of the control unit 1000 is described.

In this Figure, 1100 designates a signal shaper circuit which forms an input portion of the before mentioned various input signals 101 to 107, 120 to 123, 140 to 143. It functions to eliminate noise of these input signals and absorbs surge thereof so as to prevent malfunction of the control unit 1000 caused by the noise and destruction thereof caused by the surge, and it also performs amplification of the various input signals and conversion thereof so as to shape these signals, thereby to allow an input interface circuit 1200 to perform an accurate operation. The input interface circuit 1200 effects analog to digital (A/D) conversion of the various input signals which have been shaped by the circuit 1100, counts pulses for a predetermined time, converts these signals into digital coded signals which can be read as input data by a central processing unit (CPU) 1300 and stores them into the corresponding internal registers. The CPU 1300 operates in synchronous with a clock signal generated based on an oscillating signal generated by a crystal oscillator 1310. The CPU 1300 is connected via a bus 1320 to the input interface circuit 1200, a memory 1400, an output interface circuit 1500 and an operation timer circuit 1350. When, in operation, it executes a control program stored in a mask ROM 1410 and a PROM 1420 of the memory 1400, the CPU 1300 reads various input data from the corresponding registers within the input interface circuit 1200, performs arithmetic operations on these input data to generate various output data, delivers these output data to the corresponding registers within the output interface circuit 1500 with a predetermined timing. The memory 1400 is a storage device including in addition to the above mentioned mask ROM 1410 and the PROM 1420, a RAM 1430 and a storage holding memory 1440. The mask ROM 1410 is used to permanently store control programs and data used in executing the programs. The PROM 1420 is used to permanently store vehicle speed values, control programs which are subject to alteration depending upon the type of engine and transmission which data are written into the PROM 1420 when the latter is installed in the control system. The RAM 1430 is a random access memory which is able to read and write data and used to temporarily store intermediate data resulting from arithmetic operations performed by the CPU 1300, and temporarily store the final data resulting from the arithmetic operations executed by the CPU 1300 before they are delivered to the output interface circuit 1500. The storage contents immediately disappear when the main power source 107 is disconnected when the ignition switch 10 is turned OFF. The storage holding memory 1440 is used to store such data as those intermediate data and final data of the arithmetic operations executed by the CPU 1300 which are to be held even after the automotive vehicle stops its operation, and it can hold the above mentioned data owing to the continuously connected power source 108 even after the main power source 107 is disconnected when the ignition switch 10 is turned OFF.

The operation timer circuit 1350 is provided to reinforce the facilities of the CPU 1300. It comprises a multiplication circuit for speeding processing in the CPU 1300, an interval timer for causing an interrupt signal upon elapse of a predetermined time and a free-running counter used for measuring a time elapsed in the CPU 1300 for effecting a shift from a predetermined event to a next event and measuring the instant when the event takes place. The output interface circuit 1500 stores the output data from the CPU 1300 into the corresponding internal registers. It converts these data into pulse signals or into switching signals which go into "1" or "0" before delivering them to a drive circuit 1600. The drive circuit 1600 is a power amplifier circuit which performs voltage or current amplification of the signals from the output interface circuit 1500 so as to produce the before mentioned various output signals 201, 202, 220 to 223, 240, 241.

Designated by 1700 is a backup circuit which is activated by a monitor signal 1710 caused by monitoring the signals produced by the drive circuit 1600. When it is activated indicating that the CPU 1300 or the memory 1400 has failed to normally operate due to trouble, the backup circuit 1700 receives a portion of the signals from the signal shaper circuit 1100 and generates output signals which enables the engine 3 and the transmission 4 to continue to operate such that the automotive vehicle can continue its running and also a switching signal 1730 informing the occurrence of a trouble. The signals 1720 and 1730 are supplied to a switching circuit 1750, causing the switching circuit 1750 to cut off signals from the output interface circuit 1500 and supply in lieu thereof the signals 1720 from the backup circuit 1700 to the drive circuit 1600, thereby to enable the automotive vehicle to safely run to an auto repair shop.

Designated by 1800 is a power source circuit which is supplied with the main power source 107 and the continuously connected power source 108. The power source circuit 1800 supplies a constant voltage 1810 of 5 V from the main power source 107 to the input interface circuit 1200, CPU 1300, memory 1400, output interface cicuit 1500 and operation timer circuit 1350. It also supplies another constant voltage 1820 of 5 V to the backup circuit 1700, a signal 1830 indicative of "ON" or "OFF" state of the ignition switch 10 to the input interface circuit 1200, a reset signal 1840 and a stop signal 1850 for stopping the operation of the CPU 1300 to the bus 1320, a constant voltage 1860 for the internal A/D converter to the input interface circuit 1200, and a main voltage 1870 to the signal shaper circuit 1100, drive circuit 1600 and switching circuit 1750. Besides, the power source circuit 1800 supplies a constant voltage 1800 of 5 V from the continuously connected power source 108 to the storage holding memory 1440 for enabling same to operate even after the ignition switch 10 has been turned OFF.

Figure 4:
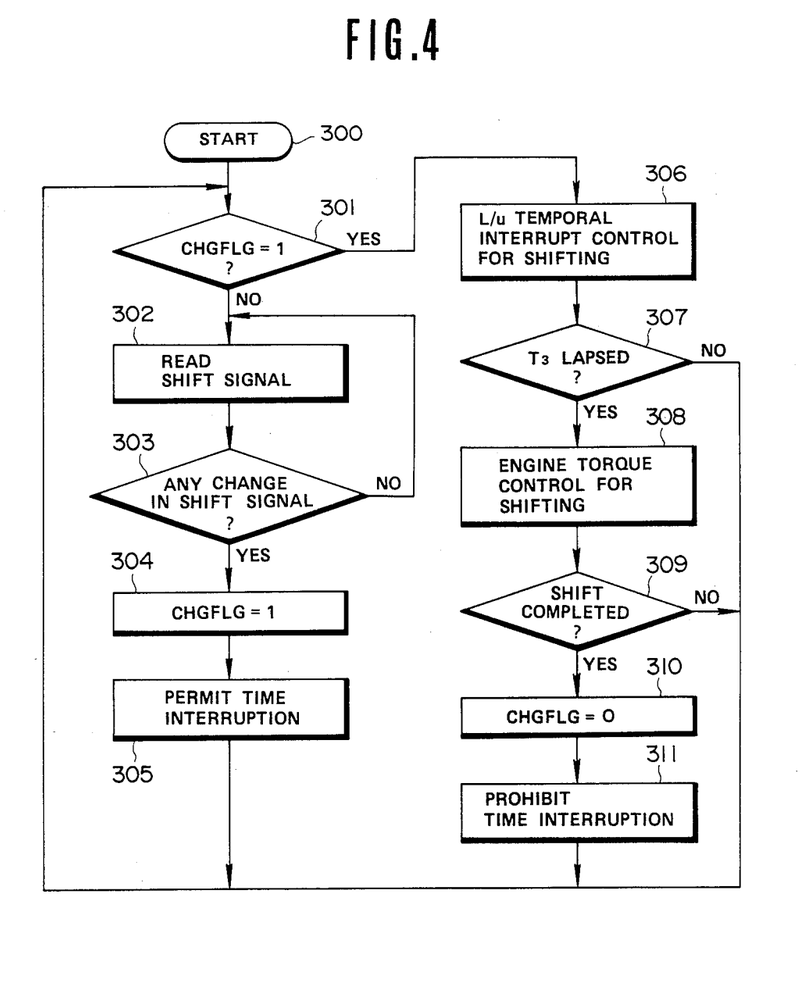
FIGS. 4 and 5 are flowcharts of control programs which are executed by the control unit.
Figure 5:
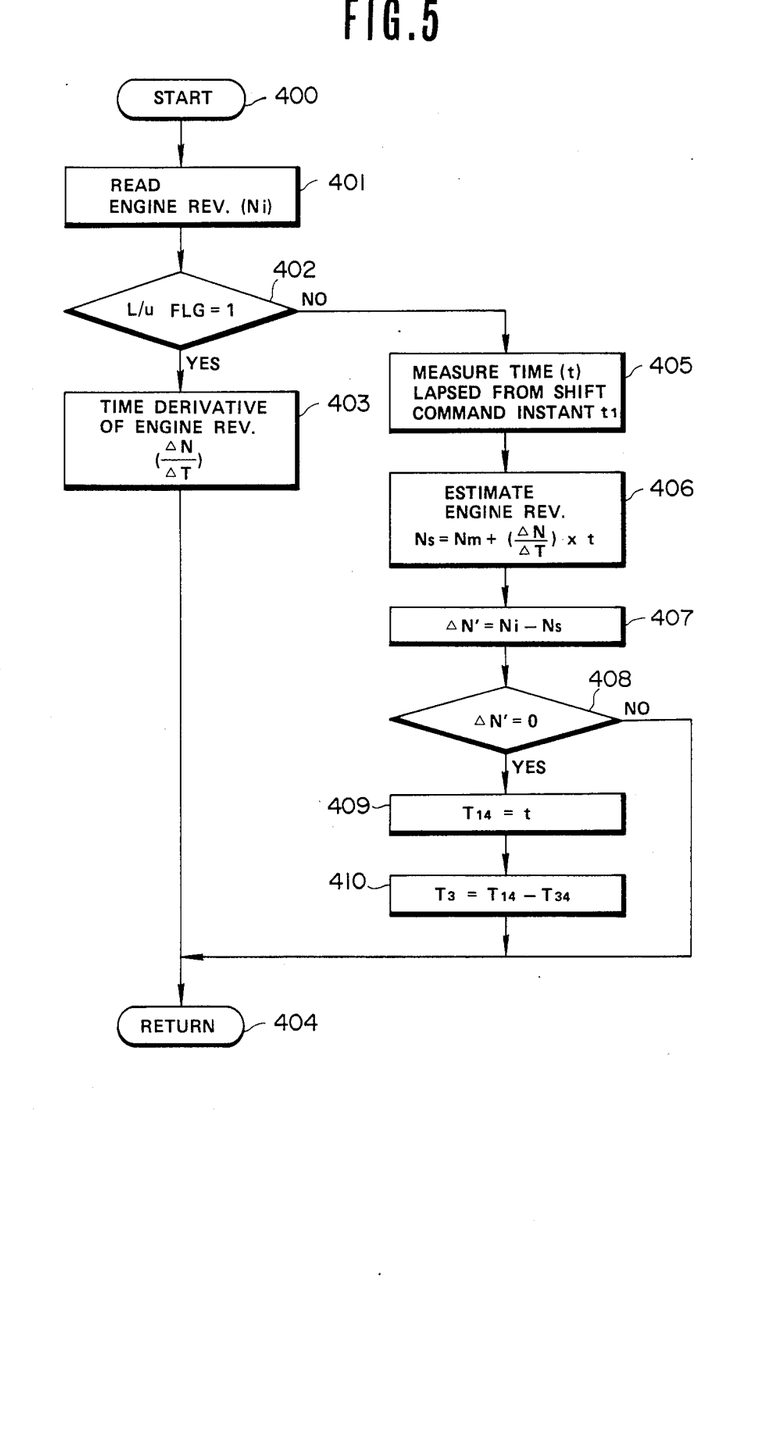

Although, with the control unit 1000 as constructed above, the power train including the engine 3 and the automatic transmission 4 is controlled, the control unit 1000 executes control programs as shown in FIGS. 4 and 5, respectively, thereby to alleviate shift shocks occurring when the automatic transmission 4 shifts from one reduction ratio to another.

Referring to FIG. 4 showing a background routine stored in the mask ROM 1410, entry of ignition switch signal 101 in a step 300 causes the execution of this illustrated routine and the execution is repeated in the CPU 1300 until the ignition switch signal 101 disappears. First of all, a step 301 is executed where a decision is made whether or not a shift flag CHGFLG is equal to 1. When the shift flag CHGFLG is 0 (zero) and thus not equal to 1, a step 302 is executed where the 1–2 shift signal 142 and 2–3 shift signal 143 are read, and the shift signals read in the present routine are compared with the corresponding shift signals which were read in the previous routine to make a decision whether or not any change has taken place in the shift signals 142 and 143. When there has been no change, meaning that the automatic transmission has not yet entered the shifting operation, the control goes back to the step 302 where the decision whether or not the shifting operation is underway is made again.

When any one of the shift signals 142 and 143 has changed in state between the previous routine and the present routine, the step 303 selects a step 304 because the automatic transmission 4 has entered into the shifting operation which begins with the generation of the shift command. In the step 304, the shift flag CHGFLG is set at 1 (one) and in the subsequent step 305, a time interruption is permitted to enable the execution of a time interruption routine as shown in FIG. 5 before returning to the step 301.

In the routines which follow after this routine, the step 301 continues to select a step 306 in accordance with the decision made that CHGFLG=1. In the step 306, a lock-up temporal interrupt control for shifting is carried out where the lock-up clutch is released to interrupt the lock-up action of the torque converter for a short period of time during a shifting operation. Describing this control referring to FIGS. 7(b), the interruption of the lock-up action begins after a predetermined time $T_1$ has lapsed from an instant $t_1$ when a shift command is made or generated and continues for a time $T_2$, whereby shift shocks are partly absorbed by the torque absorption function of the torque converter. Upon lapse of the predetermined time $T_2$, the interruption of the lock-up action ends. The detail of the lock-up interrupt control is disclosed in a copending U.S. patent application Ser. No. 657,958 (now U.S. Pat. No. 4,582,182) filed Oct. 5, 1984 which has been filed by the same applicants as the present application and commonly assigned herewith. Thus, reference should be made to this copending application.

Subsequently, the control goes to a step 307 where a decision is made whether or not a delay time $T_3$, which is determined in a manner later described, has lapsed (see FIG. 7(b)). This delay time $T_3$ is indicative of a period of time from the instant $t_1$ to an instant $t_3$ when an actual mechanical shifting operation begins in the automatic transmission 4 and thus expresses a delay of action of friction unit or units after the instant when the shift command is made due to a hydraulic circuit. This delay time $T_3$ is given or updated during execution of a time interruption routine shown in FIG. 5 which is executed periodically. Initially when this time interruption routine shown in FIG. 5 has not been executed, a mean value that is experimentarily obtained and stored in the PROM 1420 is set as the initial value of $T_3$.

When the decision in the step 307 indicates that the time $T_3$ has not yet lapsed from the instant $t_1$, i.e., when it has not arrived at the instant $t_3$ when the actual shifting operation is to begin (see in FIG. 7(b)), the control returns to the step 301. Upon lapse of the time $T_3$, the control goes from the step 307 to a step 308 where an engine output torque control for alleviating shift shocks is carried out. The magnitude of a change in the engine output torque is different depending on which one of a 1–2 shift, a 2–3 shift, a 2–1 shift, and a 3–2 shift takes place, and which also differs depending on vehicle speed. Basically, at least one of fuel injection, ignition timing, exhaust gas recirculation rate and turbo charger supercharging pressure is so altered by correcting the corresponding one of the ouput signals 220 to 224 in order to permit the transmission output shaft torque wave varies by gentle slope during a period of time beginning with the instant $t_3$ when the actual shifting operation begins to an instant $t_5$ (see FIG. 7(b)) when the shifting operation is completed. The detail of the output torque control of the engine for shifting operation is disclosed in a copending U.S. Pat. patent application ser. No. 683,354 entitled "METHOD AND APPARATUS FOR ALLEVIATING TRANSMISSION SHIFT SHOCKS" filed on Dec. 19, 1984 in the name of Hitoshi TAKEDA (now U.S. Pat. No, 4,691,285). Reference should be made to this copending application.

Subsequently, the control goes to a step 309 where a decision is made whether or not the shifting operation has been completed. This decision making involves a decision whether or not an arithmetically obtained engine revolution value is equal to an actually measured engine revolution value that is obtained from the crank angle signal 120. The arithmetically obtained engine revolution value is given by multiplying a transmission output shaft revolution with a gear ratio for a new reduction ratio to be established after the shifting operation. Thus, it is regarded that the shifting operation has progressed to the instant $t_5$ when the decision in the step 309 is YES (see FIG. 7(b)). When the shifting operation has not yet been completed, the control goes back to the step 301, whereas when the shifting operation has been completed, the control goes to a step 310 where the before mentioned shift flag CHGFLG is reset to 0 (zero) and then to the next step 311 where the time interruption is prohibited so as to prohibit execution of the time interruption routine shown in FIG. 5 before returning to the step 301.

Referring to FIG. 5, the time interruption routine is described. This time interruption routine is stored in the mask ROM 1410. This routine performs arithmetic operations based on the recognition that a time $T_{34}$ indicative of a period of time between the instant $t_3$ when the actual shifting operation begins and an instant $t_4$ when an estimated engine revolution $N_s$ (see FIG. 7(b)) is to become equal to an actually measured engine revolution $N_i$ during the interruption of the lock-up action of the torque converter (the estimated engine revolution speed can be obtained from an engine revolution trend before the interruption of the lock-up action) is constant regardless of the variation in the instant $t_2$ when the interruption of the lock-up action begins. Thus, the previously mentioned delay time $T_3$ can be given by subtracting this time $T_{34}$ from the time $T_{14}$ between the instant $t_1$ and the instant $t_4$. This routine is executed by the CPU 1300 as long as the time interruption is permitted which time interruption is permitted in the step 305 and prohibited in the step 311 in the background routine shown in FIG. 4. The CPU 1300 causes the execution of the time interruption routine shown in FIG. 5 beginning with a step 40 periodically with a predetermined interval T which interval is measured by dividing pulses generated by the crystal oscillator 1310.

Referring to FIG. 5, first of all, a step 401 is executed where an engine revolution $N_i$ is read from the crank angle signal 120 and in the next step 402, a decision is made whether or not a lock-up flag L/u FLG, which indicates that the lock-up action is underway, is equal to 1 (one). The lock-up flag L/u FLG is set at 0 (zero) when the lock-up action is interrupted and it is set at 1 (one) after the decision is made in the step 309 that the shifting operation has been completed. Therefore, when the lock-up action has not been interrupted yet, the step 402 selects a step 403 where a time derivative of engine revolution $\Delta N/\Delta T$ is computed. Describing in detail referring to FIG. 7(b), $\Delta N$ is a difference obtained by subtracting an engine revolution $N_1$ from an engine revolution $N_2$ and this $\Delta N$ is divided by $\Delta T$ which expresses time span from an instant when the engine revolution is $N_1$ to another instant when the engine revolution is $N_2$, $\Delta T$ being measured in terms of the number of execution of the time interruption routine. After the execution of this step 403, the control goes back to the background routine shown in FIG. 4.

After the interruption of the lock-up action, since the L/u FLAG=0, the step 402 selects a step 405 where a measurement is made of a time t lapsed from the instant $t_1$ when the shift command is made. This measurement is carried out by counting the number of executions of the time interruption routine. In the next step 406, the estimated engine revolution $N_s$ is obtained by the before mentioned engine revolution trend $\Delta N/\Delta T$, an engine revolution $N_m$ at the instant $t_1$ and the actually measured time t by using the following equation, $$N_s = N_m + (\Delta N/\Delta T) \times t.$$

Subsequently, in a step 407, a difference $\Delta N'$ between the actually measured engine revolution $N_i$ and the estimated engine revolution $N_s$ is obtained by the following equation, $$\Delta N' = N_i - N_s.$$

Then, in a step 408, a decision is made whether or not $\Delta N'$ is equal to 0 (zero). The fact that $\Delta N'=0$ means that it has arrived at the instant $t_4$ (see FIG. 7(b)). In the case where it has not arrived at the instant $t_4$, $\Delta N'$ is not equal to 0 (zero) so that the control goes to the step 404 and goes back to the background routine shown in FIG. 4, whereas when it has arrived at the instant $t_4$, since $\Delta N'$ is equal to 0 (zero), the step 408 selects a step 409. In the step 409, the time t which has been measured when the decision determines that $\Delta N'=0$ is stored as $T_{14}$ which indicates a period of time from the instant $t_1$ when the shift command is made to the instant $t_4$ when $N_i$ becomes equal to $N_s$. In the next step 410, the delay time $T_3$ from the instant $t_1$ to the instant $t_3$ when the actual shifting operation begins is given by an equation $T_3 = T_{14} - T_{34}$ and then the control goes back to the step 404 where the control returns to the background routine. Since, as described before the time $T_{34}$ is constant irrespective of difference between automatic transmissions and the variation in the instant $t_2$ when the interruption of the lock-up action begins. The time $T_{34}$ is experimentarily determined and stored in the PROM 1420.

The delay time $T_3$ determined as above in the time interruption routine shown in FIG. 5 is used in the step 307 for the decision making whether or not the shifting operation is about to begin. Since this delay time $T_3$ always indicates accurately an actual instant when the actual shifting operation begins, the engine output torque control, which is to begin at an instant upon lapse of the delay time $T_3$ from the instant $t_1$, is caused to begin in accurate timed relationship with the instant $t_3$ when the actual shifting operation begins. Thus, the desired shift shock alleviating effect is obtained.

Figure 6:
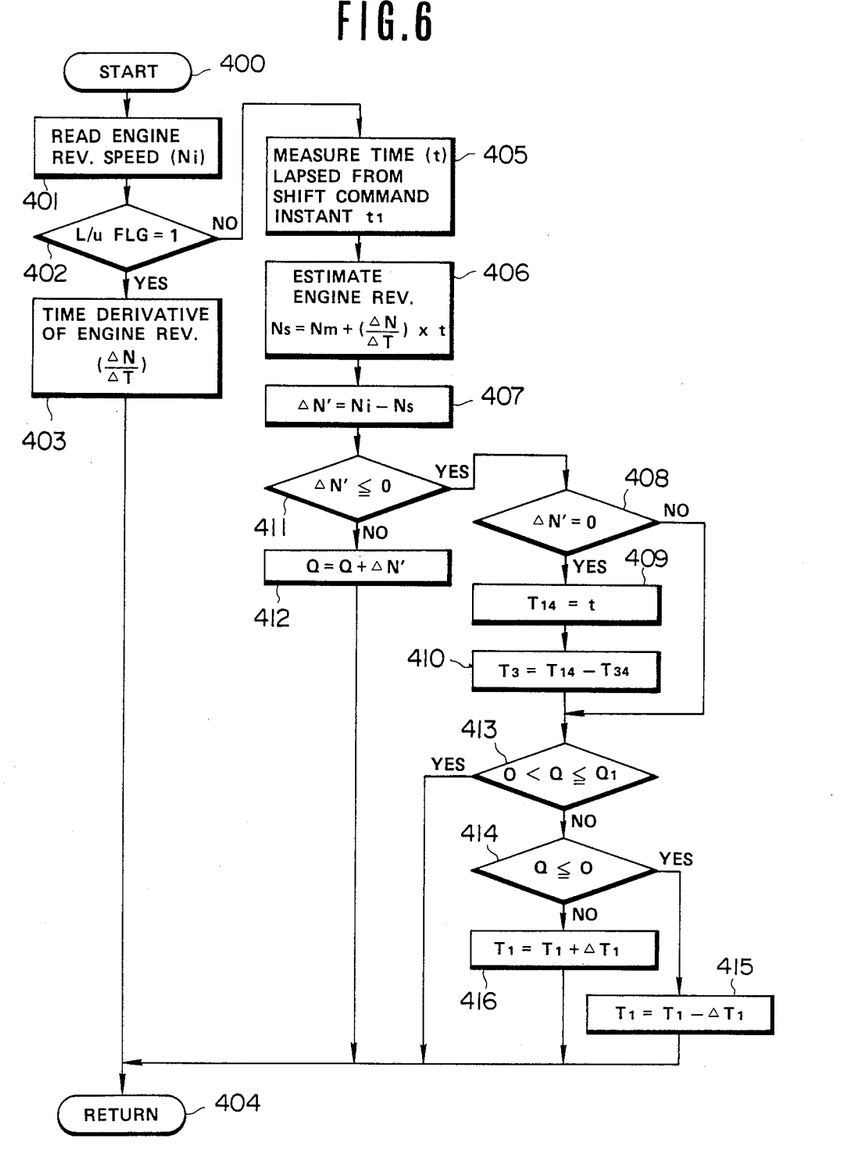
FIG. 6 is a flowchart similar to FIG. 5 illustrating a modification of the control program shown in FIG. 5.

FIG. 6 shows another example of a time interrupt routine. In this example, a programming is made to appropriately set a time $T_1$, as shown in FIGS. 7(a) and 7(b) with an instant $t_1$ when a shift command is made and ends with an instant $t_2$ when a (L/u) signal is to be turned OFF to effect the interruption of the lock-up action. This is necessary because when, as shown in FIG. 7(a), the instant $t_2$ when the lock-up action is interrupted is too early, an integral value Q of a difference between an estimated engine revolution $N_s$ and an actual engine revolution $N_i$ is large. When the interruption timing of the lock-up action is delayed too much, the integral value Q is negative. When, as shown in FIG. 7(b), the interruption timing of the lock-up action is appropriate, the integral value Q takes a small positive value. Thus, in order to suppress the integral value Q to a small positive value, the time $T_1$ (the interruption timing $t_2$ of the lock-up action) is set by execution of the time interruption routine shown in FIG. 6.

In order to accomplish the above mentioned object, the control program shown in FIG. 6 is different from the control program shown in FIG. 5 in the addition of steps 411 to 416. In a step 411, a decision is made whether or not $\Delta N' = N_i - N_s$ is less than or equal to 0 (zero), i.e., whether or not $N_i$ is less than or equal to $N_s$. When this decision determines the negative, i.e., when $N_i$ is greater than $N_s$, the integral value Q is updated by adding thereto an increment $\Delta N'$, and in the next step 404, the control goes back to the background routine shown in FIG. 4. When the decision in the step 411 determines that $\Delta N'$ is less than or equal to 0 (zero), i.e., when $N_i$ is less than or equal to $N_s$, the control goes to a step 408 where a decision is made whether or not $\Delta N'$ is equal to 0 (zero). When the decision in this step 408 determines that $\Delta N'$ is equal to 0 (zero), the previously described delay time $T_3$ is determined after the processes in the steps 409 and 410 and the result is stored in the PROM 1420 before the control goes to a step 413. When the decision in the step 408 determines that $\Delta N'$ is not equal to 0 (zero), the control goes to a step 413 bypassing steps 409 and 410.

In the step 413, a decision is made whether or not the integral value Q updated in the step 412 falls in a range that is greater than 0 (zero) and less than or equal to a positive preset value $Q_1$. This preset value $Q_1$ is a value experimentarily determined and provides an appropriate timing $t_2$ for interrupting the lock-up action. This preset value $Q_1$ is stored in the mask ROM 1410. When the decision in the step 413 determines that $0 < Q \leq Q_1$, the control goes to the step 404 to allow the control to go back to the background routine shown in FIG. 4 without altering the time $T_1$ because the present value for the time $T_1$ is apropriate and indicates the appropriate timing $t_2$. When the decision in the step 413 determines that the value Q does not satisfy $0 < Q \leq Q_1$, the control goes to a step 414 where a decision is made whether or not the value Q is greater than or equal to 0 (zero) so as to determine whether the value Q is inappropriate toward the negative side or toward the positive side. When the decision determines that the value Q is less than or equal to 0 (zero), the step 414 selects a step 415 where the time $T_1$ is decreased by a predetermined value $\Delta T_1$ because the present value for the time $T_1$ is too long to provide a delayed lock-up interruption timing. When the decision in the step 414 determines that the value Q is greater than 0 (zero), the step 414 selects a step 416 where the time $T_1$ is increased by the predetermined value $\Delta T_1$ because the present time $T_1$ is too short to provide an excessively advanced lock-up interruption timing. With the correction carried out in each of the steps 415 and 416, the time $T_1$ is corrected toward an appropriate value.

After the execution of the step 415 or 416, the control goes to the step 404 where the control goes back to the background routine shown in FIG. 4. Then, in the step 306 of the background routine, the before mentioned lock-up interruption control is carried out using the appropriately determined time $T_1$ to interrupt the lock-up action at the appropriate lock-up interruption timing $t_2$. Therefore, the torque variation absorbing function of the torque converter can be fully used, thus, in cooperation with the shift shock alleviating effect provided by the engine output torque control, alleviating shift shocks to a sufficienty low level.

What is claimed is:

1. A method of alleviating shocks occurring when an automatic transmission shifts from one reduction ratio to another reduction ratio, the automatic transmission being driven by an engine, said method comprising the steps of:
    detecting a shift command occurring in the automatic transmission and generating a shift command signal;
    varying the output torque of the engine upon lapse of a delay time from an instant when said shift command signal is generated so as to alleviate shocks occurring during an actual shifting operation; and
    determining a time from the instant when said shift command signal is generated to instant when the actual shifting operation begins and updating said delay time with said determined time.

2. A method as claimed in claim 1, wherein the output torque of the engine is varied by controlling at least one of ignition timing, fuel supply, exhaust gas recirculation rate, intake air flow rate and turbocharger supercharging pressure.

3. A method of alleviating shocks occurring when an automatic transmission shifts from one reduction ratio to another reduction ratio, the automatic transmission being driven by an engine, said method comprising the steps of:
    detecting a shift command occurring in the automatic transmission and generating a shift command signal;
    varying the output torque of the engine upon lapse of a delay time so as to alleviate shocks occurring during an actual shifting operation;
    determining a variation trend in engine revolution of the engine after generation of said shift command signal and before a predetermined condition is satisfied and generating an engine revolution variation trend signal;
    estimating an engine revolution of the engine which is to appear when said predetermined condition is satisfied based on said engine revolution variation trend signal and generating an estimated engine revolution signal;
    measuring an actual engine revolution of the engine when said predetermined condition is satisfied and generating an actual engine revolution signal;
    determining a time lapsed from the instant when said shift command signal is generated to an instant when said actual engine revolution signal substantially agrees with said estimated engine revolution signal and generating a first time signal;
    setting a time from the instant when the actual shifting operation begins to the instant when said actual engine revolution signal substantially agrees with said estimated engine revolution signal and generating a second time signal; and
    subtracting said second time signal from said first time signal to give a result and updating said delay time with said result.

4. A method as claimed in claim 3, wherein said predetermined condition involves the interruption of the lock-up action of a torque converter of the automatic transmission when the actual shifting operation progresses.

5. A method as claimed in claim 3, wherein said predetermined condition involves the interruption of the lock-up action of the automatic transmission.

6. A method as claimed in claim 3, wherein said second time signal indicates a predetermined time value.

7. A method of alleviating shocks occurring when an automatic transmission shifts from one reduction ratio to another reduction ratio, the automatic transmission having a torque converter, with a lock-up clutch, drivingly connected to an engine, the torque converter performing a lock-up action when the lock-up clutch is engaged, said method comprising the steps of:
    detecting a shift command occurring in the automatic transmission and generating a shift command signal, said shift command causing an actual shifting operation in the automatic transmission;
    interrupting the lock-up action of the torque converter when a predetermined condition is satisfied after generation of said shift command signal;
    determining a variation trend in engine revolution of the engine after generation of said shift command signal and before the interruption of lock-up action of the torque converter and generating an engine revolution variation trend signal;
    estimating an engine revolution of the engine which is to appear during the interruption of lock-up action of the torque converter based on said engine revolution variation trend signal and generating an estimated engine revolution signal;
    measuring an actual engine revolution of the engine during the interruption of lock-up action of the torque converter and generating an actual engine revolution signal;
    determining a time lapsed from an instant when said shift command signal is generated to an instant when said actual engine revolution signal substantially agrees with said estimated engine revolution signal and generating a time signal;

subtracting a predetermined time from said time indicated by said time signal to give a delay time and generating a delay time signal indicative of said delay time; and varying the output torque of the engine upon lapse of said delay time indicated by said delay time signal so as to alleviate shocks occurring during an actual shifting operation.

8. A method as claimed in claim 7, wherein said predetermined condition is satisfied upon lapse of a predetermined time after the instant when said shift command signal is generated.

9. A method as claimed in claim 8, wherein said predetermined time is corrected in response to an integral value of a difference between said actual engine revolution and said estimated engine revolution.

10. An apparatus for alleviating shocks occurring when an automatic transmission shifts from one reduction ratio to another reduction ratio, the automatic transmission being driven by an engine, said apparatus comprising:

means for detecting a shift command occurring in the automatic transmission and generating a shift command signal;

means for varying the output torque of the engine upon lapse of a delay time so as to alleviate shocks occurring during an actual shifting operation; and means for determining a time from the instant when said shift command signal is generated to an instant when the actual shifting operation begins and updating said delay time with said determined time.

11. An apparatus as claimed in claim 10, wherein said time determining means includes:

means for determining a variation trend in engine revolution of the engine after generation of said shift command signal and before a predetermined condition is satisfied and generating an engine revolution trend signal;

means for estimating an engine revolution of the engine which is to appear when said predetermined condition is satisfied based on said engine revolution variation trend signal and generating an estimated engine revolution signal;

means for measuring an actual engine revolution of the engine when said predetermined condition is satisfied and generating an actual engine revolution signal;

means for determining a time lapsed from the instant when said shift command signal is generated to an instant when said actual engine revolution signal substantially agrees with said estimated engine revolution signal and generating a first time signal;

means for setting a time from the instant when the actual shifting operation begins to the instant when said actual engine revolution signal substantially agrees with said estimated engine revolution signal and generating a second time signal; and means for subtracting said second time signal from said first time signal to give a result and generating said result in terms of said delay time signal.

12. An apparatus for alleviating shocks occurring when an automatic transmission shifts from one reduction ratio to another reduction ratio, the automatic transmission having a torque converter, with a lock-up clutch, drivingly connected to an engine, the torque converter performing a lock-up action when the lock-up clutch is engaged, said apparatus comprising:

means for detecting a shift command occurring in the automatic transmission and generating a shift command signal, said shift command causing an actual shifting operation in the automatic transmission;

means for interrupting the lock-up action of the torque converter when a predetermined condition is satisfied after generation of said shift command signal;

means for determining a variation trend in engine revolution of the engine after generation of said shift command and before the interruption of lock-up action of the torque converter and generating an engine revolution variation trend signal;

means for estimating an engine revolution of the engine which is to appear during the interruption of lock-up action of the torque converter based on said engine revolution variation trend signal and generating an estimated engine revolution signal;

means for measuring an actual engine revolution of the engine during the interruption of lock-up action of the torque converter and generating an actual engine revolution signal;

means for determining a time lapsed from an instant when said shift command signal is generated to an instant when said actual engine revolution signal substantially agrees with said estimated engine revolution signal and generating a time signal;

means for subtracting a predetermined time from said time indicated by said time signal to give a delay time and generating a delay time signal indicative of said delay time; and means for varying the output of the engine upon lapse of said delay time indicated by said delay time signal so as to alleviate shocks occurring during an actual shifting operation.

* * * * *